March 8, 1955 D. D. GRIMES ET AL 2,703,478
ROCKET GRAIN SHOCK ABSORBING APPARATUS
Filed June 18, 1953 3 Sheets-Sheet 1

INVENTORS
HOWARD W BISHOP
DAVID D. GRIMES
ROBERT L. SCHMIDT
BY
ATTORNEYS

INVENTORS
HOWARD W. BISHOP
DAVID D. GRIMES
ROBERT L. SCHMIDT

United States Patent Office 2,703,478
Patented Mar. 8, 1955

2,703,478

ROCKET GRAIN SHOCK ABSORBING APPARATUS

David D. Grimes, Howard W. Bishop, and Robert L. Schmidt, Silver Spring, Md., assignors to the United States of America as represented by the Secretary of the Navy Application June 18, 1953, Serial No. 362,484

12 Claims. (Cl. 60—35.6)

This invention relates generally to aerial vehicles; more particularly it relates to an improved shock absorbing apparatus for preventing the sudden shifting of propellent grains in the rocket sustainer casing of a rocket powered missile, while at the same time permitting the gradual thermal expansion or contraction of said grains.

Propellent materials for rockets possess high heat expansion coefficients compared with those of the metals used in the rocket sustainer casing. As a consequence, differential thermal expansion or contraction occurs, whereby the propellent grains expand against the end walls of the rocket casing or shrink within the limits thereof. In either case, a highly undesirable situation arises. Expansion against the end walls of the casing produces compressive stresses within the grains and if great enough, result in the rupturing of said grains. Contraction permits the shifting of the grains and when the missile undergoes severe decelerations or accelerations during flight, violent collisions occur between said grains and the end walls. As a result, the grains sometimes rupture or split or serious damage is done to the missile or its instrumentation equipment.

The use of coil springs or other spring means is prohibited by the low compressive strength of the grains. Springs strong enough to oppose the forces arising during deceleration will rupture or at least deform the grains.

It is, therefore, an object of the present invention to eliminate these detrimental effects by providing a shock absorbing apparatus mounted within the rocket sustainer casing at one end of the propellent grains, for effectively preventing the shifting of the grains while at the same time allowing and compensating for changes in grain length caused by temperature variations.

Another object is to provide a shock absorbing apparatus which will resist sudden impacts but will be responsive to gradual pressures by making use of the peculiar properties of "silicone putty" or, as it is commonly known, "bouncing putty."

Further objects and advantages of the invention will become evident from a reading of the following description, in conjunction with the appended drawings, in which.

This invention generally contemplates a shock absorbing apparatus particularly designed to be mounted in the forward portions of a rocket sustainer casing in front of the propellent grains contained by said casing for controlling movements of said grains relative to said casing under certain flight conditions. The apparatus employs a plurality of shock absorbers mounted on a plate secured to the missile casing. The shock absorbers are fixed to a pressure plate which is caused by springs to constantly bear upon the forward ends of the propellent grains so that no slack occurs from thermally induced changes in grain length.

Each shock absorber comprises a piston mounted for sliding movement in a cylinder filled with a viscous fluid such as the silicone compound commonly termed "silicone putty" or "bouncing putty," which is capable of withstanding sudden impacts but will yield to sustained pressures. A longitudinal aperture is provided through the piston to allow the passage of the fluid from one side of the piston to the other when the piston is in motion. The aperture is further provided with a ball check valve to furnish additional restraint to the rapid flow of the fluid through said aperture, thus further impeding the rapid movement of the piston. In this manner the sudden movement of the piston is restrained by two factors; namely, the inherent reluctance of the viscous fluid to be suddenly deformed and the action of the check valve in limiting the rate of flow from one side of the piston to the other.

In immobilizing the propellent grains of a rocket powered missile the piston is fixed to the plate secured to the missile casing and the cylinder is fixed to the pressure plate, or vice versa. The sustained pressure exerted by the springs bearing upon the pressure plate permits the relative movement of the piston and cylinder to allow said pressure plate to engage the forward ends of the propellent grains. Any thermal expansion of the grains is manifested in the application of a sustained pressure on the pressure plate to provoke the relative movement of the piston and cylinder. The flow of the fluid within the cylinder is occasioned by the application of sustained pressures, thus permitting the accommodation of thermal expansion. In the event that the propellent grains contract away from the pressure plate, the springs exert a sustained pressure to cause the relative movement of the piston and cylinder and the re-engagement of the pressure plate with the grains.

Figure 1:
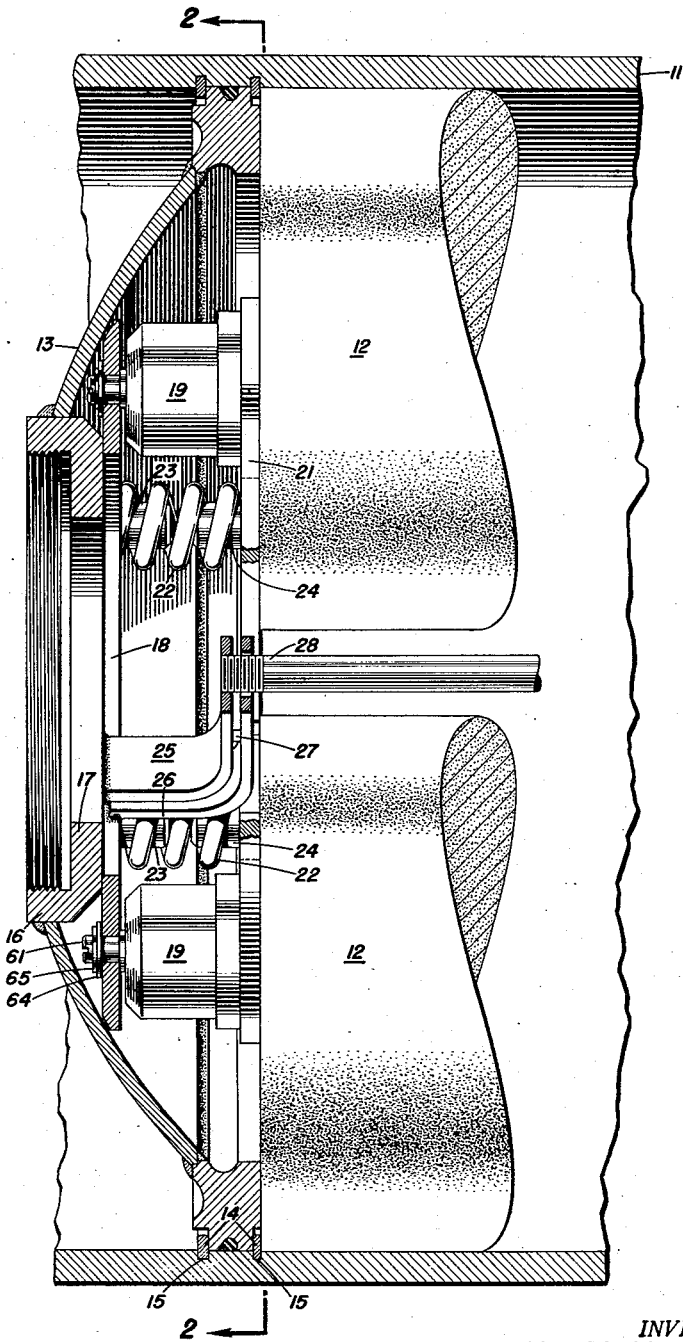
Fig. 1 is an axial section, partly in elevation, through a rocket powered missile in the region of the forward end of the rocket sustainer casing, illustrating the general construction of a shock absorbing apparatus constituting this invention, and particularly showing the mode of attachment of said shock absorbing apparatus to the sustainer casing.
Figure 2:
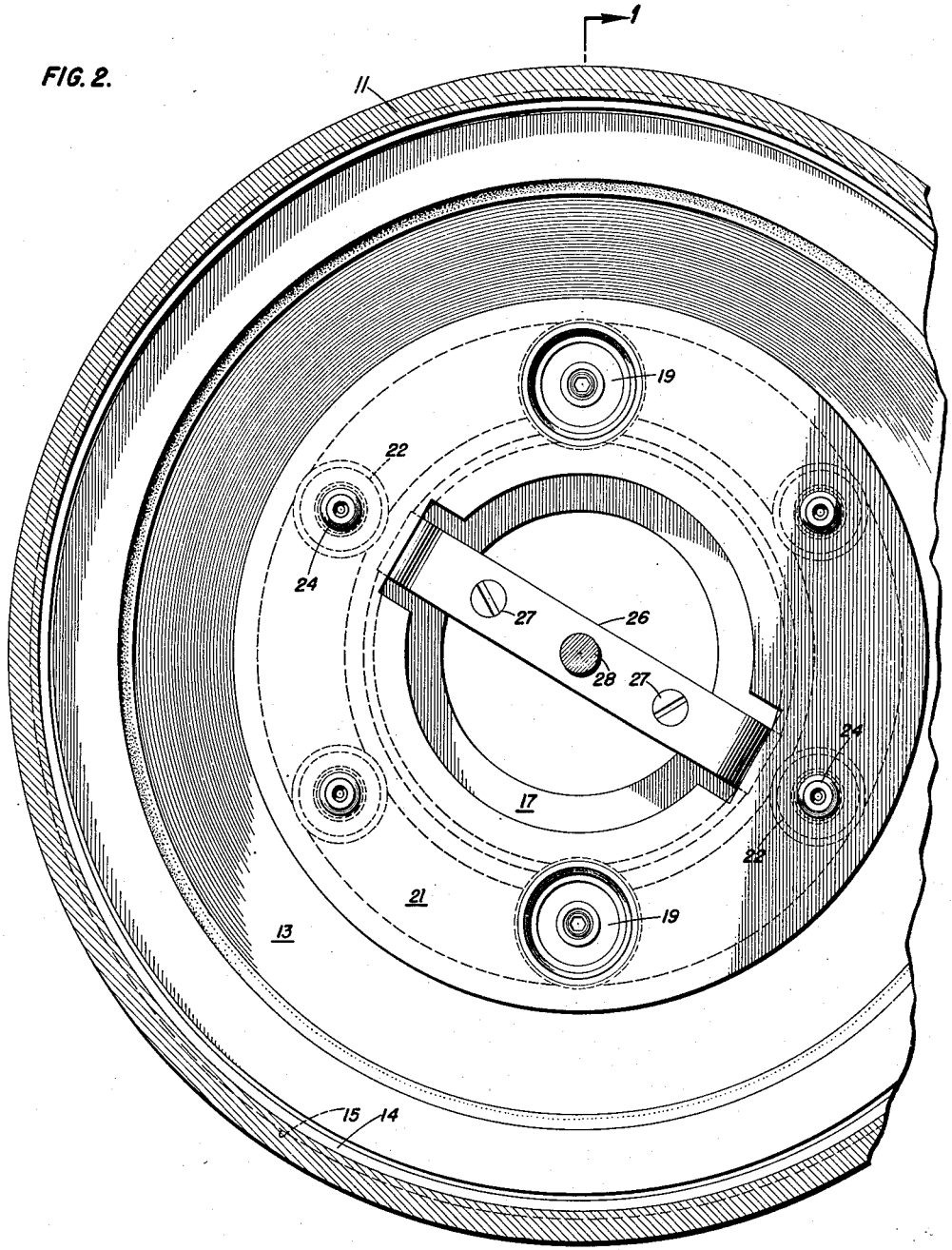
Fig. 2 is a transverse section through the missile on line 2—2 of Fig. 1, illustrating the shock absorbing apparatus and the preferred locations of the shock absorbers embodying the present invention with respect to the sustainer casing.

Referring now to the drawings and in particular to Figs. 1 and 2, a portion of the missile casing 11 is shown. The casing contains propellent grains 12 and has a forward end portion 13 supported, as by retaining rings 14, engaging in annular grooves 15 provided in the inner wall of said casing. The forward end portion 13 of the casing is fitted with an axially mounted coupling sleeve 16 having an inwardly directed flange 17.

The shock absorbing apparatus embodying the invention includes an annular plate 18 secured, in a manner to be described hereinafter, to the forward end portion 13 and two shock absorbers 19, the structures of which will also be described hereinafter, secured to said annular plate at diametrically opposite locations. The shock absorbers 19, in turn, support a pressure plate 21 which, under the bias of a plurality of coil springs 22 positioned between the annular plate 18 and said pressure plate, is caused to bear upon the propellent grains 12 contained within the casing 11. Upon the annular plate 18 are mounted four hubs 23 which are in registry with four more hubs 24 mounted upon the pressure plate 21. Each of the four pairs of alined hubs serve to position a coil spring 22 between said pressure plate and the annular plate 18.

The shock absorbing apparatus is supported in the casing 11 by the annular plate 18 which is rigidly secured to the forward end portion 13 by inner and outer U-shaped brackets, 25 and 26, respectively. The inner bracket 25 is welded or otherwise fixed to the flange 17 of the forward end portion 13 and the outer bracket 26 is suitably secured to the annular plate 18; the two brackets being held together by screws 27. A resonance rod 28 passing coaxially through the casing 11 between the propellent grains 12 to the rear of said casing is supported by the inner bracket 25, and an igniting mechanism may be accommodated in a space at the forward ends of said grains. The resonance rod 28 is commonly employed in rockets to prevent the breakup of the propellent grains during burning and is not a part of the present invention.

Figure 3:
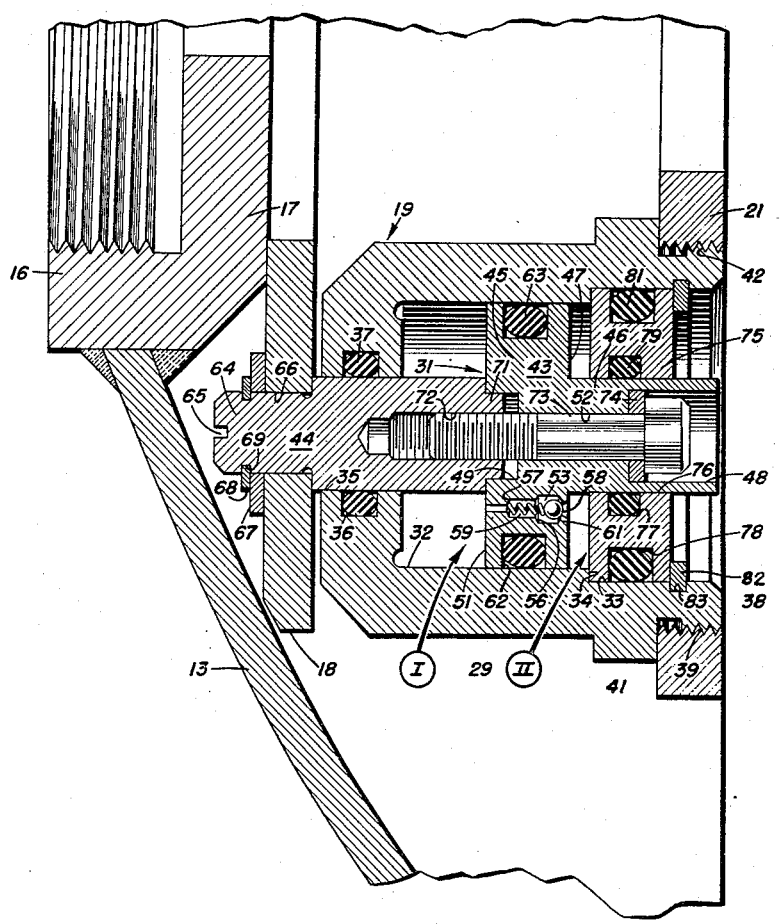
Fig. 3 is an enlarged detailed sectional view of a shock absorber as it would appear as a component of the shock absorbing apparatus mounted in the missile.

A typical shock absorber 19, which can be understood best by reference to Fig. 3, includes a cylinder 29 and a piston assembly 31, to be described in more detail hereinafter, mounted within said cylinder. As best seen in Fig. 2, two shock absorbers are employed in the illustrated embodiment of the invention, although a greater number may be used, if desired. The cylinder 29 is formed with a cavity 32 and a recess 33 coaxial with, and of larger diameter than, said cavity, thus defining a shoulder 34. At the bottom of the cavity 32 is a coaxial bore 35 which passes through the cylinder 29. An annular groove 36 is provided in the annular wall of the bore 35 and defines a stuffing box for containing a sealing ring 37. The cylinder 29 has formed externally on its open end 38 a threaded portion 39 and a flange 41. The threaded portion 39 is screwed into a corresponding threaded hole 42 in the pressure plate 21 until the flange 41 abuts said plate, thereby securing the cylinder 29 to said plate.

The piston assembly 31, consisting of a piston 43 and a piston rod 44, is slidably contained within the cavity 32 with the piston rod 44 projecting through the bore 35. The piston 43 divides the cavity 32 of the cylinder 29 into two chambers, I and II, the volumetric capacities of which are variable depending upon the position of said piston within said cavity. The piston 43 is constituted by a disk 45 having a coaxial stem 46 projecting from one side 47 thereof. The stem 46 serves to adjust the volumetric capacity of chamber II compatible with the volumetric capacity of chamber I as varied by the displacement of the piston rod 44 in chamber I. A recess 48 is formed in the outer end of the stem 46 and a second recess 49 is formed in the opposite side 51 of the disk. A coaxial bore 52 connects the two recesses 48 and 49.

The disk 45 is formed with a port 53 passing therethrough; said port being of stepped configuration to define a seat 56 and a shoulder 57. A ball 58 is contained within the port 53 and is adapted to engage the seat 56 to close said port. Seated upon the shoulder 57 within the port 53 is a light coil spring 59 which bears upon the ball 58 to yieldably restrain its engagement with the seat 56. The mouth of the port 53 is staked to form protuberances 61 which retain the ball 58 within said port. An annular groove 62 is formed in the outer peripheral surface of the disk 45 and receives a packing ring 63 which bears upon the walls of the cavity 32 to prevent leakage from one side of said disk to the other.

The piston rod 44 is formed on its outer end portion with a reduced extension 64, the end of which is formed with a transverse groove 65. The reduced extension 64 is passed through a hole 66 in the forward plate 18 and is held secure to said plate by a washer 67 and a retaining ring 68, the latter of which engages in an annular groove 69 in the peripheral wall of said extension.

The inner end of the piston rod 44 has a hub 71 formed thereon and a threaded hole 72 coaxially tapped therein; said hub snugly fitting into the recess 49 in the piston 43. A bolt 73 passes through the bore 52 in the piston 43 and is screwed into the threaded hole 72 of the piston rod 44, thus rigidly connecting the piston with the piston rod. A gasket 74, placed at the bottom of the recess 48 of the piston 43 and under the head of the bolt 73, prevents leakage through the bore 52.

The open end 38 of the cylinder 29 is closed by an annular end plate 75, having a central opening 76 through which the stem 46 of the piston snugly slides. Annular recesses 77 and 78 are formed in the inner and outer peripheral walls, respectively, of the plate 75 and sealing rings 79 and 81, respectively, are contained within said recesses. The end plate 75 is supported by the shoulder 34 of cylinder 29 and is held in position by a retaining ring 82 which engages in a peripheral groove 83 formed in the wall of the recess 33.

A silicone compound, of the type commonly referred to as "silicone putty" or "bouncing putty," fills the cavity 32 substantially throughout.

The operation of the invention is as follows:

The coil springs 22 urge the pressure plate 21 rearwardly into contact with the propellent grains 12. Concurrently, the cylinder 29 moves rearwardly along with the plate 21, whereas the piston 43, being attached through piston rod 44 to the annular plate 18, remains stationary. In this manner, the fluid silicone compound is forced from the forward chamber I through the port 53 past ball 58 and into rear chamber II.

In order to prevent the locking of the piston assembly 31 in the cylinder 29, an increase of volumetric capacity in chamber I caused by the movement of said piston assembly relative to said cylinder must be accompanied by an equal decrease in volumetric capacity in chamber II. The stem 46 serves to adjust the volumetric capacity of chamber II in accordance with any changes in the volumetric capacity of chamber I brought about by the relative movements of the piston rod assembly and the cylinder.

The innate reluctance of the silicone compound to be deformed retards the movement of the cylinder 29. Nevertheless, the silicone fluid yields slowly to sustained pressures, such as those exerted by the springs 22, and does permit the gradual movement of the cylinder. When the pressure plate 21 makes contact with the propellent grains, further movement is stopped.

It can be seen that the pressure plate 21, under the influence of the coil springs 22, will at all times contact the ends of the propellent grains 12. The thermal contraction of the grains will cause the further gradual, rearward movement of the pressure plate 21 in response to the compression of the coil springs 22.

The thermal expansion of the grains will exert a forward pressure upon the pressure plate 21 and the cylinder 29, thus displacing the silicone fluid from rear chamber II, through the port 53 into the forward chamber I. As previously pointed out, although the silicone fluid resists rapid deformation, sustained pressure exerted by the thermally expanding grains will cause the fluid to be displaced.

The ball check valve, which includes the ball 58 contained within the port 53, the light spring 59, and the seat 56 will operate to cut off the flow of fluid from the chamber II to the chamber I when such flow is great enough to move the ball 58 against the light spring 59 and seat it on the seat 56. The flow of fluid caused by thermally induced expansion is not sufficiently great to operate the check valve. However, the sudden force, such as that exerted by the propellent grains 12 upon the pressure plate 21 during the rapid deceleration of the missile, will cause the fluid to flow at a rate sufficient to operate the ball check valve and thus cut off further flow. When the flow of silicone fluid from one chamber to the other ceases, so does the movement of the pressure plate 21. In this manner, the impact resisting qualities of the silicone fluid are supplemented by operation of the check valve and the forward shifting of the propellent grains 12 is arrested.

It is, therefore, evident that thermally induced changes in grain length are permitted by the shock absorbing apparatus, whereas, a rapid movement of the grains 12 induced by a sudden force is resisted.

Other modifications and variations of this invention are obviously possible in the light of the foregoing detailed description and drawings. It is, therefore, to be understood that the foregoing description and drawings shall not be construed as limiting upon the appended claims.

What is claimed is:

1. In combination with an aerial vehicle having a rocket casing constructed with a forward wall and propellent grains contained within said casing, a shock absorber mounted in said casing and adapted to engage said propellent grains to resist sudden movement of said grains with respect to said casing, said shock absorber comprising a cylinder adapted to engage said grains, a piston having a port therethrough and working in said cylinder, said piston being connected to the forward end wall of said casing, and a fluid filling said cylinder to resist sudden relative movements of said piston and cylinder.

2. In combination with an aerial vehicle having a rocket casing constructed with a forward wall and propellent grains contained within said casing, a shock absorber mounted in said casing and adapted to engage said propellent grains to resist sudden movement of said grains with respect to said casing, said shock absorber comprising a cylinder adapted to engage said grain, a piston having a port therethrough and working in said cylinder, said piston being connected to the forward end wall of said casing, a fluid filling said cylinder, and a check valve disposed in said port to control the flow of said fluid through said port.

3. In combination with an aerial vehicle having a rocket casing constructed with a forward wall and propellent grains contained within said casing, a shock absorber mounted in said casing and adapted to engage said propellent grains to resist sudden movement of said grains with respect to said casing, said shock absorber comprising a cylinder having a cavity, a piston having a port therethrough, said piston working in said cylinder, a piston rod for the piston, means for adjusting the differences in volumetric capacity on either side of said piston due to the displacement of the piston rod in said cylinder, and a fluid filling said cavity to resist sudden relative movements of said piston and cylinder.

4. An arrangement as set forth in claim 3, with additionally a check valve disposed in the port of the piston to control the flow of fluid through said port.

5. In combination with an aerial vehicle having a rocket casing constructed with a forward wall and propellent grains contained within said casing, a shock absorber mounted in said casing and adapted to engage said propellent grains to resist sudden movement of said grains with respect to said casing, said shock absorber comprising a cylinder, a piston slidable in the cylinder and having a port therethrough, a piston rod connected to one face of said piston, means projecting from the other face of said piston simulating said piston rod to adjust the differences in volumetric capacity on either side of said piston due to the displacement of said piston rod in said cylinder, means for closing said cylinder, and a fluid compound filling said cylinder to resist sudden relative movements of said piston and cylinder.

6. An arrangement as set forth in claim 5, with additionally a check valve in the port to control the flow of compound through said port, and sealing means between said piston and said cylinder to prevent leakage past said piston.

7. In a missile having a casing and propellent grains, a shock absorbing apparatus for preventing the shifting of said propellent grains, comprising an immovable plate mounted in the forward end of the casing in front of the propellent grains, a movable plate supported between said immovable plate and the propellent grains, spring means urging said movable plate into engagement with the propellent grains, and a plurality of shock absorbers each of which includes a cylinder, a movable piston working within said cylinder, and a viscous fluid contained within said cylinder to resist movement of said piston, said shock absorbers being mounted on said immovable plate and connected to said movable plate to resist sudden movements of said movable plate and grains with respect to said immovable plate.

8. In a missile having a casing and propellent grains, a shock absorbing apparatus for preventing the shifting of said propellent grains, comprising an immovable plate mounted in the forward end of the casing in front of the propellent grains, a movable plate supported between said immovable plate and the propellent grains, spring means urging said movable plate into engagement with the propellent grains, and a plurality of shock absorbers each of which includes a cylinder connected to said movable plate, a piston having a port therethrough working in said cylinder, said piston being connected to said immovable plate, and a fluid filling said cylinder to resist sudden relative movements of said piston and cylinder, whereby shifting of the movable plate and grains will be restrained.

9. In a missile having a casing and propellent grains, a shock absorbing apparatus for preventing the shifting of said propellent grains, comprising an immovable plate mounted in the forward end of the casing in front of the propellent grains, a movable plate supported between said immovable plate and the propellent grains, spring means urging said movable plate into engagement with the propellent grains, and a plurality of shock absorbers each of which includes a cylinder connected to said movable plate, a piston having a port therethrough working in said cylinder, said piston being connected to said immovable plate, and a fluid silicone compound filling said cylinder to resist sudden relative movements of said piston and cylinder.

10. In a missile having a casing and propellent grains, a shock absorbing apparatus for preventing the shifting of said propellent grains in the casing, comprising an immovable plate mounted in the forward end of the casing in front of the propellent grains, a movable plate supported between said immovable plate and the propellent grains, spring means urging said movable plate into engagement with the propellent grains, and a plurality of shock absorbers each of which includes a cylinder connected to said movable plate, a piston working in the cylinder and having a port therethrough, a piston rod on the piston and connected to said immovable plate, means for adjusting the difference in volumetric capacity on either side of said piston due to the displacement of said piston rod in said cylinder, and a fluid silicone compound filling said cylinder to resist sudden relative movements of said piston and cylinder.

11. A shock absorbing apparatus for preventing the shifting of propellent grains in the rocket sustainer casing of a rocket powered missile, comprising an immovable plate mounted in the forward end of the casing in front of the propellent grains, a movable plate supported between said immovable plate and the propellent grains, spring means urging said movable plate into engagement with the propellent grains, and a plurality of shock absorbers each of which includes a cylinder connected to said movable plate, a piston in the cylinder and having a port, a piston rod connected to one face of said piston and connected to said immovable plate, means projecting from the other face of said piston and simulating said piston rod to adjust the differences in volumetric capacity on either side of said piston due to the displacement of said piston rod in said cylinder, and a fluid silicone compound filling said cylinder throughout to resist sudden relative movements of said piston and cylinder.

12. An arrangement as set forth in claim 11, with additionally a check valve in the port to control the flow of silicone compound through said port.

References Cited in the file of this patent

UNITED STATES PATENTS 1,812,010    McBride _____ June 30, 1931